United States Patent [19]

Onoda

[11] Patent Number: 4,992,974
[45] Date of Patent: Feb. 12, 1991

[54] DATA PROCESSING DEVICE FOR PROCESSING A COMBINATION OF DATA ITEMS

[75] Inventor: Hiroshi Onoda, Kariya, Japan

[73] Assignee: Brother Kogyo Kabushiki Kaisha, Japan

[21] Appl. No.: 462,949

[22] Filed: Jan. 5, 1990

Related U.S. Application Data

[63] Continuation of Ser. No. 192,359, May 10, 1988, abandoned.

[30] Foreign Application Priority Data

May 12, 1987 [JP] Japan ................. 62-70543

[51] Int. Cl.⁵ .............. G06F 12/00; G06F 15/40
[52] U.S. Cl. ................. 364/900; 364/972.2; 364/927.61; 364/943; 364/943.43; 364/943; 364/42
[58] Field of Search ... 364/200 MS File, 900 MS File; 340/709, 710

[56] References Cited

U.S. PATENT DOCUMENTS

| | | | |
|---|---|---|---|
| 4,384,329 | 5/1983 | Rosenbaum | 364/300 |
| 4,456,973 | 6/1984 | Carlgren et al. | 364/300 |
| 4,683,468 | 7/1987 | Himelstein | 340/709 |
| 4,725,829 | 2/1988 | Murphy | 340/709 |
| 4,739,314 | 4/1988 | McCaskill et al. | 340/709 |
| 4,774,666 | 9/1988 | Miyao et al. | 364/900 |
| 4,783,759 | 11/1988 | Borgendale et al. | 364/900 |
| 4,786,894 | 11/1988 | Furusawa et al. | 340/709 |

FOREIGN PATENT DOCUMENTS 0115947 6/1986 European Pat. Off.

OTHER PUBLICATIONS

IBM Technical Disclosure Bulletin, vol. 26, No. 11, Apr. 1984, pp. 6110–6111, N.Y., U.S., R.G. Carlgren et al.

Primary Examiner—David Y. Eng
Attorney, Agent, or Firm—Oliff & Berridge

[57] ABSTRACT

In a data processing device for processing a preset procedure with respect to one data item or two data items shown on a display means (e.g. liquid crystal display, cathode ray tube or printed paper), the designating operation of the one data item and that of the two data items are made common and simplified. When a pointer points one of the data elements of a data item, the data item is designated. When the pointer points between two data items, a combination of the two data items before and after the pointer is designated.

13 Claims, 5 Drawing Sheets

CURSOR

DATA PROCESSING DEVICE FOR PROCESSING A COMBINATION OF DATA ITEMS

This is a continuation of application Ser. No. 07/192,359 filed May 10, 1988, now abandoned.

BACKGROUND OF THE INVENTION

This invention relates to a data processing device in which a data item is designated from a plurality of data items shown on a display of an output device and processed according to a preset procedure. For example, a word processor having a function of deletion or replacement of one of displayed words is one possible application of the invention.

In a conventional data processing device, the designation of a desired data item, e.g. a word, from a plurality of data items shown on the display means is performed by manually inputting the data item from the keyboard or by pointing the starting point and the ending point of the data item on the display.

In an improved word processor, a desired word can be designated by simply placing a cursor on one of the letters of the desired word.

When a combination of two data items (two words) is desired to designate in order to process them at the same time according to the preset procedure, however, the method of the improved word processor is incompetent: only one data item can be designated at one time by the method. In such a time, the two data items had to be manually input from the keyboard or the starting point and the ending point of them had to be pointed on the display.

SUMMARY OF THE INVENTION

Therefore an object of the present invention is to facilitate the designation of a combination of data items, as well as a single data item, on a display means of an output device.

To achieve this and other objects, the data processing device of the present invention comprises, as shown in FIG. 1, display means M1 for displaying plural data items; a memory M2 for storing said plural data items so as to correspond to respective display site of said display means M1; pointing means M3 for pointing a site of the display means M1; and data processing means M4 for reading out a data item displayed at the site pointed by the pointing means M3 from the memory M2 based on the site and for processing the data item according to a preset procedure, wherein the improvement is that the data processing means M4 comprises combination processing means M5 for reading out two data items, one being displayed before the site pointed by the pointing means M3 and the other being displayed after the site pointed by the pointing means M3, from the memory M2 based on the site when there is no data item at the site of the display means M1 pointed by the pointing means M3, and for processing a combination of said two data items as a data item according to the preset procedure.

For example, a phrase or a combination of two words can be designated at one time by pointing a space between the two words in a word processor.

BRIEF EXPLANATION OF THE DRAWINGS

The invention may be best understood by referring to the following description of the preferred embodiment and the drawings in which:

FIG. 4a1–4b4 show display screens at various stages in the synonym search processing.

DETAILED DESCRIPTION OF THE EMBODIMENT

Figure 1:
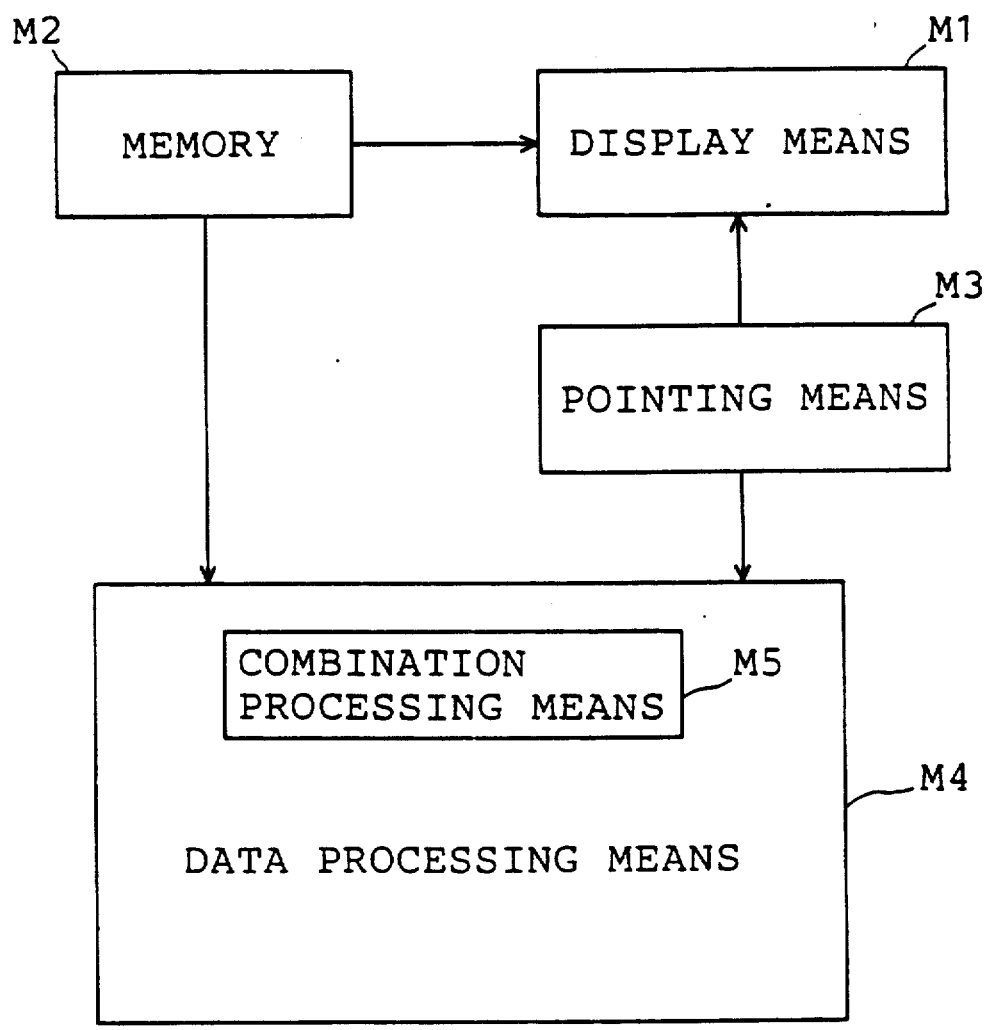
FIG. 1 is a block diagram illustrating a construction of the present invention.
Figure 2:
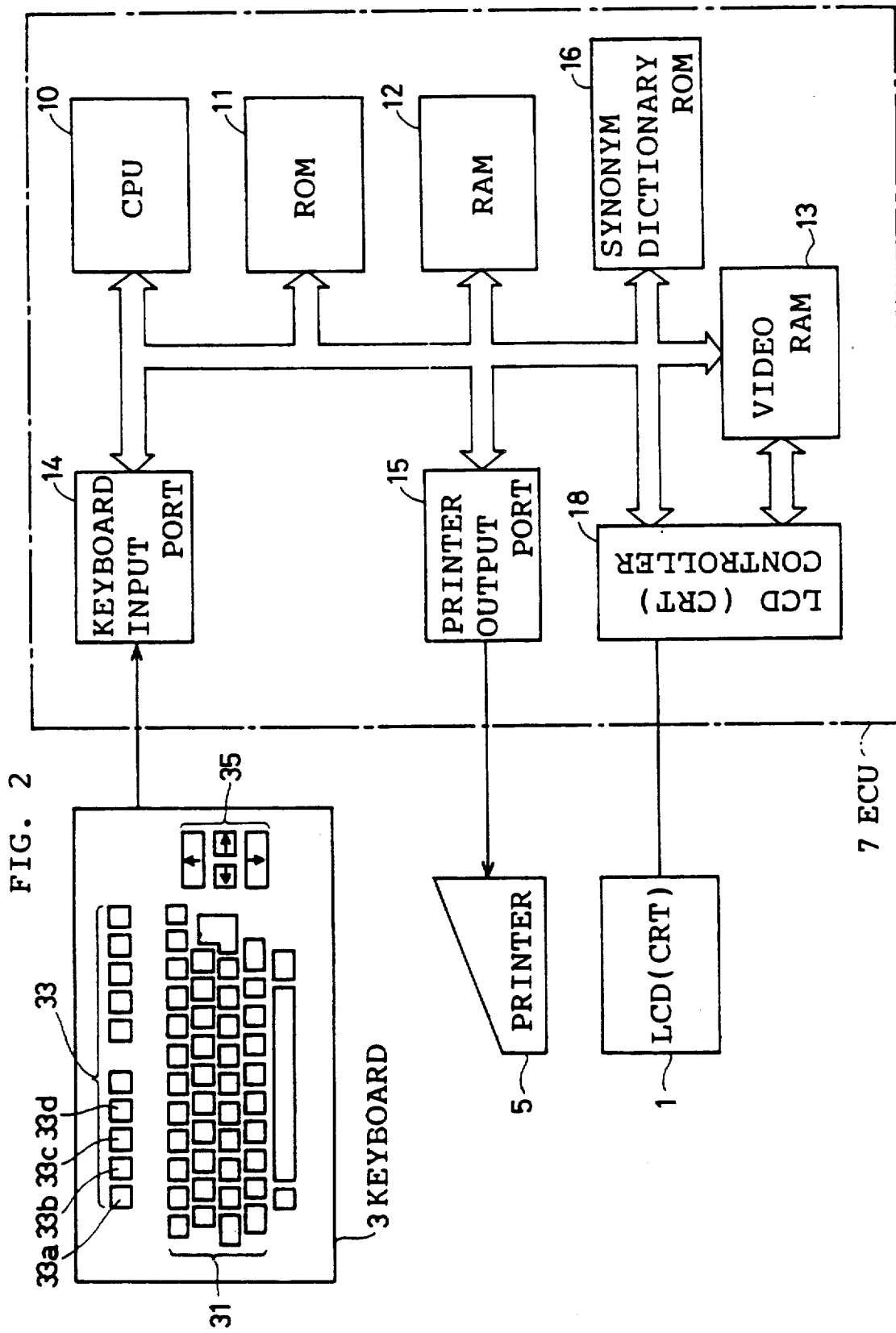
FIG. 2 is a block diagram showing a construction of a word processor as an embodiment of the invention.

An embodiment of the invention here described is a word processor having a function of synonym presentation and replacement of a word or words by the presented synonym. As shown in the block diagram of FIG. 2, the word processor includes: a liquid crystal display (LCD) 1 as the display means M1; a keyboard 3 as the pointing means M3; a printer 5; and an ECU 7 as the data processing means M4. The LCD 1 may be replaced by a cathode ray tube (CRT) which makes no difference in this invention. The ECU 7 is constructed as a logical processing unit including: known CPU 10, ROM 11 and RAM 12, here the RAM 12 acting as the memory M2 of the invention; video RAM 13 for storing image data to be displayed on the display screen of the LCD 1; a keyboard input port 14 for inputting data from the keyboard 3; a printer output port 15 for outputting data to the printer 7; synonym dictionary ROM 16; and an LCD controller 18 for controlling the LCD 1.

The video RAM 13 utilizes a known dual-port RAM which is accessible independently from the CPU 10 as well as from the LCD controller 18. The LCD controller 18 reads out the image data in the video RAM 13 repeatedly by a cycle time determined by the scanning frequency of the LCD 1 and outputs the image data to the LCD 1, whereby the data written in the video RAM 13 by the CPU 10 is displayed on the LCD screen without delay.

The keyboard 1 is furnished with character keys 31, command keys 33 and cursor movement keys 35. The command keys 33 includes: a search start key 33a for commanding a start of a synonym search processing; a search key 33b for commanding a search of a synonym of a designated word or words from the synonym dictionary ROM 16; a replace key 33c for commanding replacement of the word or words by the searched synonym; and an end key 33d for commanding an end of an editing processing including the synonym search processing. The command keys 33 include other keys for commanding various operations of text editing and for executing printing, which are not specifically shown in the figure. The cursor movement keys 35 includes four direction keys for moving a cursor displayed on the LCD screen in accordance with the cursor signal output from the CPU 10 to the LCD controller 18.

A general operation of the word processor is as follows. The operator of the word processor inputs text by operating the character keys 31. The input text is stored in the RAM 12 and can be edited by operating the command keys 33. The finished text can be printed by the printer 5.

Figure 3:
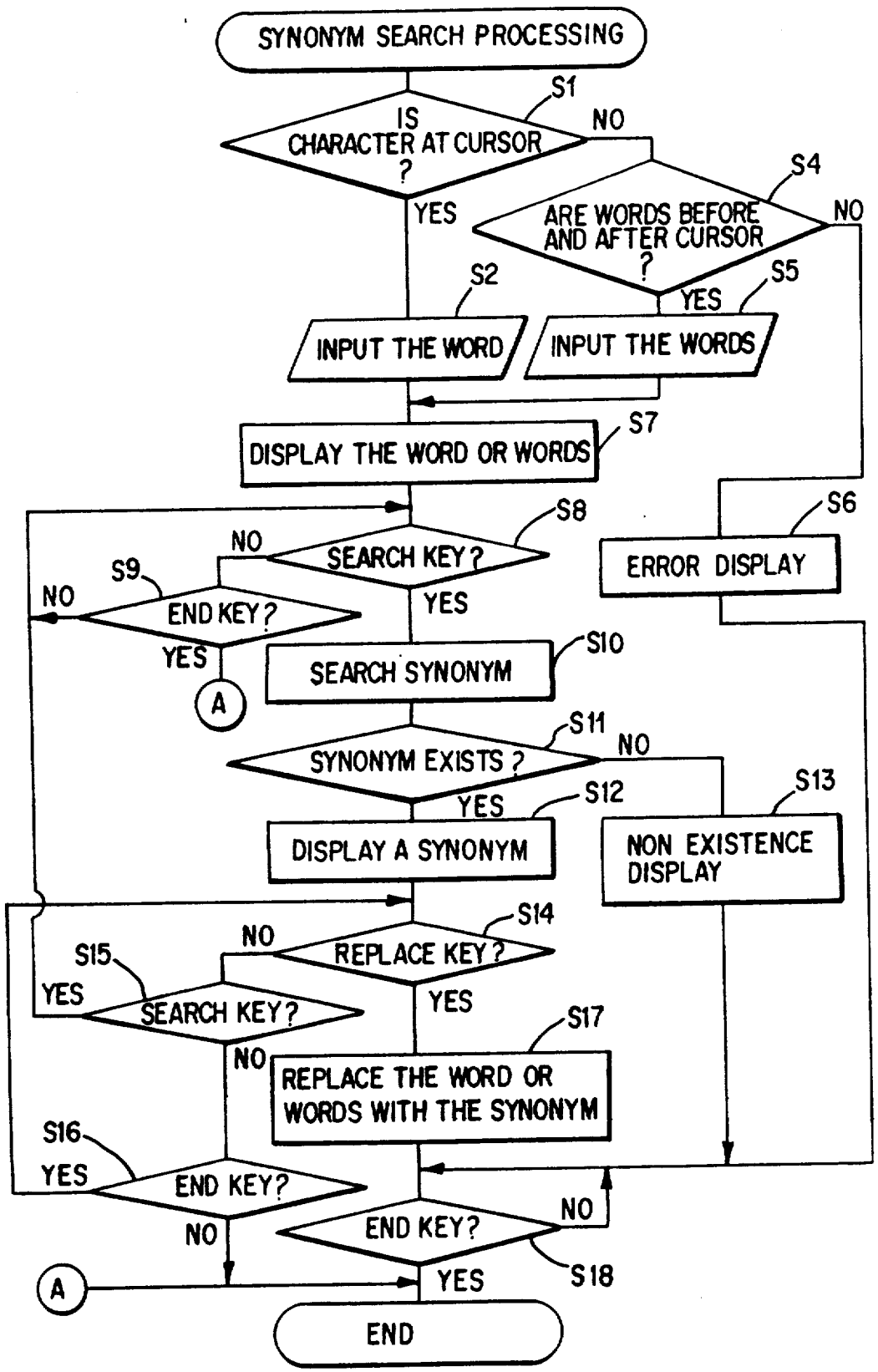
FIG. 3 is a flowchart of a synonym search processing executed by an electronic control unit (ECU) of the word processor.

The synonym search and replacement processing executed by the ECU 7, which constitutes the data processing means M4, is hereinafter explained with reference to FIG. 3. This processing is started responsive to a pressing of the search start key 33a. First in this processing, it is determined at S1 whether a character exists or not at a site pointed by the cursor on the LCD screen. When the answer is yes, i.e. there is a character at the cursor site, a character string (a word) including the character is read out at S2 from the RAM 12. The extent of the character string is determined (or a word is recognized) by a preset word-separating codes (e.g. a space, comma, etc.) before and after the character string including the character. Of course, the character string includes one composed of only one character.

When it is determined at S1 that there is no character at the cursor site, it is then determined at S4 whether there are words before and after the cursor site. If the answer is yes, the two words are read out from the RAM 12 at S5. Otherwise, i.e. if there is no word before, after or at both sides of the cursor, an error message is displayed on the LCD 1 at S6.

The processings at S1 through S5 are for inputting a word or words in order to designate a reference word or words of the synonym search. As shown at (a-1) of FIG. 4, when the cursor is placed on a letter of a word ("old"), the word is input as a reference for the synonym search. On the other hand, as shown at (b-1) of FIG. 4, when the cursor is placed between two words ("at_once"), the two words before and after the cursor are input as a reference of the synonym search. In this embodiment, the processings at S4 and S5 act as the combination processing means M5.

Figure 4:
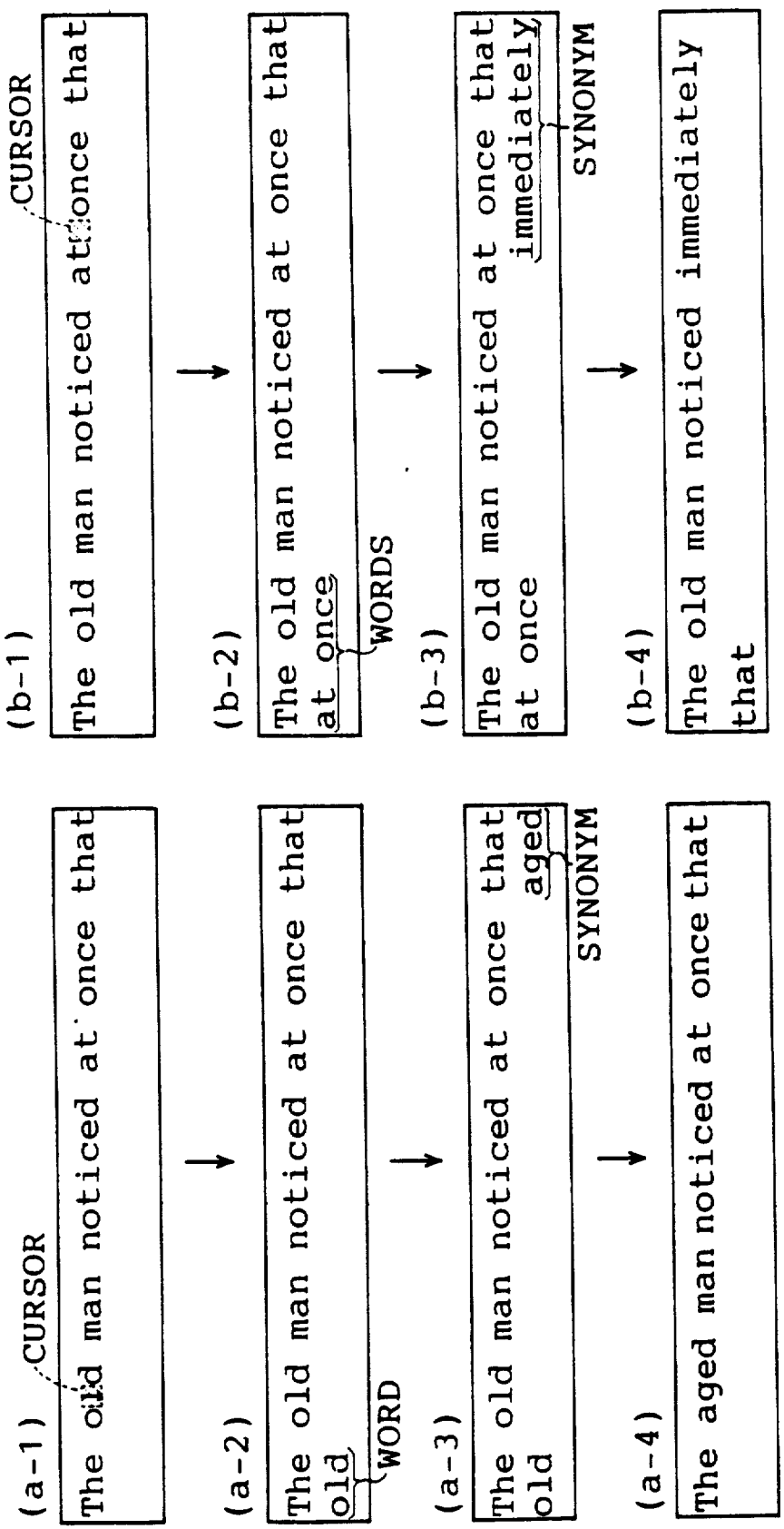

When the reference word or words is input, as shown at (a-2) and (b-2) of FIG. 4, the input word or words are displayed in a preset area of the LCD screen at S7 and the operation of the search key 33b or the end key 33d is waited at S8 and S9. When the end key 33d is pressed, i.e. the answer at S9 is yes, this routine ends here. At this time, the word or words displayed in the preset area of the LCD screen is erased. When the search key 33b is pressed, i.e. the answer at S8 is yes, a synonym is searched at S10 in the synonym dictionary ROM 16 corresponding to the input word or words and it is determined at S11 whether a synonym of the word or words exits in the synonym dictionary ROM 16. If a synonym of the word or words exists in the synonym dictionary ROM 16, the synonym is displayed in a preset second area of the LCD screen at S12, as shown at (a-3) and (b-3) of FIG. 4. If no synonym exists, non-existence message is displayed in the second area of the LCD screen at S13.

When there exist plural synonyms of the reference word or words input at S2 or S5 in the synonym dictionary ROM 16, one at the first place in the synonym dictionary ROM 16 is read out and displayed at S12. Every time the search key 33b is pressed thereafter, the next synonym is displayed in place of the previous one in the second area of the LCD screen.

After the synonym is displayed on the LCD screen, operation of the replace key 33c, the search key 33b or the end key 33d is waited at S14, S15 and S16. When the end key 33d is pressed, i.e. the answer at S16 is yes, this routine ends here. When the search key 33b is pressed, i.e. the answer at S15 is yes, S12 is repeatedly executed to display another synonym in the second area. Of course, if only one synonym exists in the synonym dictionary ROM 16, the synonym display is not changed. When all the synonyms have been displayed and there is no subsequent synonym exists in the synonym dictionary ROM 16, the first synonym is displayed again.

When it is determined at S14 that the replace key 33c is pressed at this time, the word or words designated by the cursor is replaced by the synonym displayed in the second area of the LCD screen at S17, as shown at (a-4) and (b-4) of FIG. 4. Then the operation of the end key 33d is waited at S18. When the end key 33d is pressed at S18, this synonym search processing ends. This S18 is also executed after the error message is displayed at S6 or after the non-existence message is display at S13.

As described above, in searching a synonym, two words can be simultaneously designated by simply placing the cursor between them and pressing the search start key 33a in this embodiment, so that operation is simplified in designating either a word or words.

An LCD 1 is exemplified for the output device M2 in the above embodiment, but, as described before, a cathode ray tube (CRT) can work just in the same manner as the LCD 1. In both cases, the cursor on the display screen is useful in designating a word or words because the cursor is easily moved by operating four direction keys 35 on the keyboard 3 or by operating a mouse. Alternatively, numeric keys can be operated to identify the location of the word or words on the display screen.

The invention is also applicable to a typewriter without LCD or CRT in which the printed paper can work as the display means M1. In this case, the pointing means M3 is embodied by the print head on the carriage of the printer. A word or words can be designated by placing the print head on the word or between words and a predetermined processing is performed with respect to the word or words.

Figure 5:
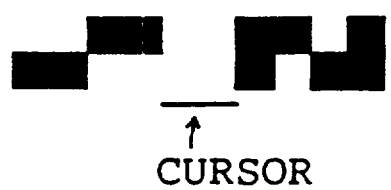
FIG. 5 is another example of the data items that can be dealt with by the invention.

As the above embodiment is a word processor, the data item of the invention is embodied by a word and the preset procedure processed with respect to the word or words is to search a synonym thereof. The data item can be a numeric data or a mathematical expression to which a predetermined mathematical procedure (e.g. self summation and summation of two, self multiplication and multiplication of two) is performed. Further, this invention is applicable to a data processing device for dealing graphic data, such as shown in FIG. 5.

Obviously, many modifications and variations of the present invention are possible in light of the above teachings. It is therefore to be understood that within the scope of the appended claims, the invention may be practiced otherwise than as specifically described.

What is claimed is:

1. A data processing device having:
   display means for displaying plural data items and spaces in display sites, where adjacent data items are separated by a space;
   a memory for storing said plural data items and spaces in storage sites that correspond to the display sites of the display means;
   pointing means for pointing at any one of the display sites of the display means, where the display site at which the pointing means points is a desired display site;
   data processing means for reading out a selected data item from the memory when a data item is displayed at least in part at the desired display site and for processing the selected data item according to a preset procedure, where the selected data item is the data displayed at least in part at the desired display site;
   combination processing means for reading a combination data item from the memory and for processing the combination data item according to the preset procedure when a space is displayed at the desired display site, where the combination data item is the two data items separated by the space displayed at the desired display site;

initiating means for initiating operation of the data processing means and the combination processing means; and error signal display means for displaying an error signal on the display means if, when the data processing means and the combination processing means are initiated, a space is displayed at the desired display site and data items do not exist on both sides of the desired display site.

2. The data processing device according to claim 1, wherein each data item is a word.

3. The data processing device according to claim 2, wherein the preset procedure is to search for synonyms of the data item or combination data item in pre-stored synonym dictionary memory.

4. The data processing device according to claim 2, wherein the display means is paper on which the words are printed by a printer having a print head and means for controlling the location of the print head and wherein the pointing means points at the desired display site by locating the print head of the printer at a desired location.

5. The data processing device according to claim 1, wherein the display means is a liquid crystal display.

6. The data processing device according to claim 5, wherein the pointing means points at the desired display site by placing a cursor on a display screen of the liquid crystal display at a desired location.

7. The data processing device according to claim 5, wherein the pointing means points at the desired display site by placing a cursor on a display screen of the cathode ray tube at a desired location.

8. The data processing device according to claim 1, wherein the display means is a cathode ray tube.

9. The data processing device according to claim 1 wherein the display means is a paper on which the data items are printed by a printer having a print head and means for controlling the location of the print head and the pointing means points at the desired display site by locating the print head of the printer at a desired location.

10. A data processing device having:

display means for displaying plural data items and spaces in display sites, where adjacent data items are separated by a space;

a memory for storing said plural data items and spaces in storage sites that correspond to the display sites of the display means;

pointing means for pointing at any one of the display sites of the display means, where the display site at which the pointing means points is a desired display site;

combination processing means for reading out of the memory and processing a combination data item when a space is displayed at the desired display site, where the two data items of the combination data item are the data items on both sides of the space displayed at the desired display site;

initiating means for initiating operation of the combination processing means; and error signal display means for displaying an error signal on the display means if, when the combination processing means is initiated, a space is displayed at the desired display site and data items do not exist on both sides of the desired display site.

11. The data processing device according to claim 10 further comprising a data processing means for reading out a selected data item from the memory when a data item is displayed at least in part at the desired display site and processing the selected data item according to the preset procedure, where the selected data item is the data item displayed at least in part at the desired display site; and the initiating means further initiates operation of the data processing means.

12. The data processing device according to claim 11 further comprising:

search memory means containing a synonym dictionary, wherein each data item is a word and the processing means performs the preset procedure by searching the synonym dictionary for synonyms of the word of the selected data item when a data item is displayed at least in part at the desired display site or the two words of the combination data item when a space is displayed at the desired display site.

13. The data processing device according to claim 12 further comprising synonym display means for selectively displaying on the display means the synonym when at least one synonym is found in the synonym dictionary of the word of the selected data item or words of the combination data items or for displaying on the display means a message indicating that no synonym exists when no synonym is found in the synonym dictionary.

* * * * *